US005409632A

United States Patent [19]

Showell et al.

[11] Patent Number: 5,409,632

[45] Date of Patent: Apr. 25, 1995

[54] CLEANING AND BLEACHING COMPOSITION WITH AMIDOPEROXYACID

[75] Inventors: Michael S. Showell; Philip G. Sliva, both of Cincinnati, Ohio; Stefano Scialla, Rome, Italy; Anna M. Vercillo-Martino, Rende, Italy; Elisabetta L. Russo, Rome, Italy

[73] Assignee: The Procter & Gamble Company, Cincinnati, Ohio

[21] Appl. No.: 976,863

[22] Filed: Nov. 16, 1992

[51] Int. Cl.$^6$ .............................................. C01B 15/055

[52] U.S. Cl. ........................... 252/186.23; 252/186.22; 252/186.26; 252/186.27; 252/186.28; 252/186.29; 252/186.31; 252/186.38; 252/95

[58] Field of Search ....................... 252/186.22, 186.23, 252/186.26, 186.28, 186.29, 186.3, 186.31, 186.38, 95

[56] References Cited

U.S. PATENT DOCUMENTS

| | | | |
|---|---|---|---|
| 3,664,961 | 5/1972 | Norris | 252/99 |
| 3,996,152 | 12/1976 | Edwards et al. | 252/186 |
| 4,100,095 | 7/1978 | Hutchins et al. | 252/99 |
| 4,292,192 | 9/1981 | Hooper et al. | 252/132 |
| 4,536,314 | 8/1985 | Hardy et al. | 252/102 |
| 4,539,130 | 9/1985 | Thompson et al. | 252/94 |
| 4,541,944 | 9/1985 | Sanderson | 252/95 |
| 4,606,838 | 8/1986 | Burns | 252/94 |
| 4,634,551 | 1/1987 | Burns et al. | 252/102 |
| 4,642,198 | 2/1987 | Humphreys et al. | 252/94 |
| 4,686,063 | 8/1987 | Burns et al. | 252/102 |
| 4,758,369 | 7/1988 | Dryoff et al. | 252/94 |
| 4,767,557 | 8/1988 | Herdeman | 252/91 |
| 4,781,854 | 11/1988 | Overton et al. | 252/100 |
| 4,824,591 | 4/1989 | Dryoff et al. | 252/94 |
| 4,824,592 | 4/1989 | Dryoff et al. | 252/95 |
| 4,828,747 | 5/1989 | Rerek et al. | 252/95 |
| 4,852,989 | 8/1989 | Burns et al. | 8/107 |
| 4,853,143 | 8/1989 | Hardy et al. | 252/102 |
| 4,900,469 | 2/1990 | Farr et al. | 252/95 |
| 4,909,953 | 3/1990 | Sadlowski | 252/99 |
| 4,929,377 | 5/1990 | Emmons et al. | 251/100 |
| 4,931,583 | 6/1990 | Hull et al. | 560/180 |
| 4,964,870 | 10/1990 | Fong et al. | 8/111 |
| 4,981,606 | 1/1991 | Barnes | 252/95 |
| 4,992,194 | 2/1991 | Liberati et al. | 252/99 |
| 4,997,590 | 3/1991 | Bowling | 252/186.31 |
| 5,004,558 | 4/1991 | Dryoff et al. | 252/95 |
| 5,039,447 | 8/1991 | Reuben | 252/186.26 |
| 5,049,298 | 9/1991 | Ploumen et al. | 252/95 |
| 5,055,218 | 10/1991 | Getty et al. | 252/94 |
| 5,073,285 | 12/1991 | Liberati et al. | 252/94 |
| 5,076,952 | 12/1991 | Ahmed et al. | 252/95 |
| 5,091,106 | 2/1992 | Jacobs et al. | 252/186.26 |
| 5,098,598 | 3/1992 | Sankey et al. | 252/186.42 |
| 5,118,436 | 6/1992 | Aoyagi et al. | 252/99 |
| 5,126,066 | 6/1992 | Torenbeek et al. | 252/95 |
| 5,288,423 | 2/1994 | Behan et al. | 252/174.11 |

FOREIGN PATENT DOCUMENTS

| | | |
|---|---|---|
| 10609/92 | 8/1992 | Australia . |
| 0167375 | 1/1986 | European Pat. Off. . |
| 0176124A3 | 4/1986 | European Pat. Off. . |
| 0201958A1 | 11/1986 | European Pat. Off. . |
| 0240481A1 | 10/1987 | European Pat. Off. . |
| 0254331A1 | 1/1988 | European Pat. Off. . |
| 0256443A1 | 2/1988 | European Pat. Off. . |
| 0340847A2 | 8/1989 | European Pat. Off. . |
| 0347988A1 | 12/1989 | European Pat. Off. . |
| 0386566A1 | 12/1990 | European Pat. Off. . |
| 91870207 | 12/1991 | European Pat. Off. . |
| 92870188 | 11/1992 | European Pat. Off. . |

OTHER PUBLICATIONS

Pending European Patent Application No. 91870207.7, Hardy et al, filed Dec. 13, 1991 (equivalent to PCT/US 92/10455).

Pending European Patent Application No. 92870188.7, Scialla et al, filed Nov. 16, 1992.

Pending U.S. Ser. No. 07/898,851, Huber et al, filed Jun. 15, 1992.

*Primary Examiner*—Robert L. Stoll
*Assistant Examiner*—Joseph D. Anthony
*Attorney, Agent, or Firm*—Michael D. Jones; Jerry J. Yetter; Jacobus C. Rasser

[57] ABSTRACT

An aqueous cleaning and bleaching composition with a pH of from about 0.5 to about 6, which contains amidoperoxyacid, hydrogen peroxide, and acylated citrate ester which has been emulsified in two or more ethoxylated alcohols is described.

15 Claims, No Drawings

CLEANING AND BLEACHING COMPOSITION WITH AMIDOPEROXYACID

TECHNICAL FIELD

The present invention relates to stable aqueous cleaning and bleaching compositions with a pH as is of from about 0.5 to about 6, which contain amidoperoxyacid, hydrogen peroxide, acylated citrate ester, and two or more ethoxylated alcohols.

BACKGROUND OF THE INVENTION

Bleaching compositions comprising hydrogen peroxide and bleach activators have been described in the art. The bleach activator reacts with the hydrogen peroxide to yield a peracid which is the bleaching species.

Activated bleaching compositions however have the drawback that the activator and the hydrogen peroxide tend to react in the composition. Such activated bleaching compositions may be chemically unstable upon storage.

Another problem is that bleach activators which are hydrophobic, such as acylated citrate esters, are problematic to use in aqueous compositions because product may separate into two different layer phases which can be seen by the consumer. Therefore, physical stability upon storage is a further issue.

The present invention includes an aqueous cleaning and bleaching composition with a pH of from about 0.5 to about 6.0, comprising amidoperoxyacid, hydrogen peroxide, and acylated citrate ester which has been emulsified in ethoxylated alcohols with a weighted average Hydrophilic-Lipophilic Balance equal to that of the acylated citrate ester. The compositions allow for good flexibility in formulating and are chemically and physically stable on storage. As an additional benefit, the ethoxylated alcohol mixture used to emulsify the activator provides efficient cleaning.

Before making up the formulations of the present invention, it was expected that the amidoperoxyacid would react with the other active ingredients in the composition, particularly the hydrogen peroxide and the activator, adversely affecting the chemical and physical stability of the product and impairing bleaching performance of the amidoperoxyacid. It was also expected that the amidoperoxyacid would dissolve in the composition and recrystallize, causing the product to gel. Surprisingly, the present compositions containing amidoperoxyacid are physically and chemically stable and clean and bleach well.

U.S. Pat. No. 5,118,436, Aoyagi et al, issued Jun. 2, 1992 discloses an acidic liquid bleaching composition comprising hydrogen peroxide, anionic and nonionic surfactants, polyacrylic acid and/or maleic polymer, and polyphosphoric, amino phosphonic, or diphosphonic acids, or salts thereof.

U.S. Pat. No. 4,828,747, Rerek et al., issued May 9, 1989 discloses an aqueous liquid bleaching composition of pH 1-6.5 comprising a solid, particulate, substantially water insoluble organic peroxyacid which is said to be stably suspended by a structuring combination of anionic surfactant, ethoxylated nonionic surfactant and fatty acid.

SUMMARY OF THE INVENTION

The present invention is an aqueous cleaning and bleaching composition comprising, by weight of the composition:

(a) from about 1 to about 15% of amidoperoxyacid;

(b) from about 0.5 to about 20% of hydrogen peroxide;

(c) from about 1 to about 15% of acylated citrate ester; and (d) from about 5 to about 25% of two $C_{8-18}$ alcohols which have been ethoxylated with an average from about 2 to about 15 moles of ethylene oxide per mole of alcohol, wherein the ethoxylated alcohols have a difference in Hydrophilic-Lipophilic Balances of at least 2, and wherein a mixture of the ethoxylated alcohols has a weighted average Hydrophilic-Lipophilic Balance equal to that of the acylated citrate ester; wherein the acylated citrate ester is emulsified in the composition by the ethoxylated alcohols, and wherein the pH as is of the composition is from about 0.5 to about 6.

The present invention also encompasses a process for making the present composition.

DETAILED DESCRIPTION OF THE INVENTION

The compositions according to the present invention are aqueous. Accordingly, they comprise, by weight of the composition, from about 10% to about 95%, preferably from about 30% to about 90%, most preferably from about 60% to about 80%, of water. Deionized water is preferably used.

Although the present invention finds a preferred application in formulating activated laundry cleaning bleaching compositions, it is also applicable to the formulation of any cleaning/bleaching compositions. Bleach compositions of the present invention are preferably used in the wash cycle along with a granular (preferred) or liquid laundry detergent.

The present invention covers an aqueous cleaning and bleaching composition comprising: amidoperoxyacid; hydrogen peroxide; acylated citrate ester; and a blend of $C_{8-18}$ alcohols which have been ethoxylated with an average from about 2 to about 15 moles of ethylene oxide per mole of alcohol, wherein the ethoxylated alcohols have a difference in Hydrophilic-Lipophilic Balances of at least 2, and wherein a mixture of the ethoxylated alcohols has a weighted average Hydrophilic-Lipophilic Balance equal to that of the acylated citrate ester; wherein the acylated citrate ester is emulsified in the composition by the alcohols, and wherein the pH as is of the composition is from about 0.5 to about 6.

Formulating the compositions according to the present invention in this acidic pH range (about 0.5–6) contributes to the stability of the composition. The compositions are preferably formulated in a pH range of from about 1 to about 5. The pH of the composition can be trimmed by all means available to the person skilled in the art.

The compositions herein preferably do not comprise polyacrylic acid and/or maleic polymer, or polyphosphoric, amino phosphonic, or diphosphonic acids, or salts thereof. They preferably do not comprise anionic surfactant. Embodiments without fatty acid, particularly short chain, are preferred.

Hydrogen Peroxide

Compositions according to the present invention comprise hydrogen peroxide or a water-soluble source thereof. Suitable water-soluble sources of hydrogen peroxide include perborate, percarbonate and persulphate salts. Preferably, compositions according to the present invention comprise from about 0.5% to about 20% by weight of the total composition of hydrogen peroxide, preferably from about 2% to about 10%, most preferably from 3% to 8%.

Acylated citrate esters

The compositions herein comprise from about 1 to about 15 wt %, preferably from about 2 to about 10 wt %, of acylated citrate ester.

The acylated citrate esters of the present invention are preferably of the formula:

$$\begin{array}{c} CH_2-COOR' \\ | \\ R-COO-C-COOR'' \\ | \\ CH_2-COOR''' \end{array}$$

wherein R', R'' and R''' are independently selected from the group consisting of H, $C_{1-18}$ alkyl, $C_{1-18}$ alkenyl, substituted phenyl, unsubstituted phenyl, alkylphenyl, and alkenylphenyl, and R is selected from the group consisting of $C_1$–$C_9$ alkyl, $C_1$–$C_9$ alkenyl, substituted phenyl, unsubstituted phenyl, alkylphenyl, and alkenylphenyl. Mixtures of acylated citrate esters are also included here i n.

It is best for the efficiency and stability of the peracid precursors according to the present invention that R', R'' and R''' should not all be H in a given molecule. Preferably, R is $C_1$–$C_9$ alkyl, and R', R'' and R''' are selected from the group consisting of H, $C_{1-4}$ alkyl, and $C_{1-4}$ alkenyl, but R', R'' and R''' are not all H. Most preferably, R', R'' and R''' are methyl or ethyl.

In the bleaching or disinfecting operation, the acylated citrate esters according to the present invention will react with hydrogen peroxide to yield peracids and citrate esters. The peracid generated depends on the R group which is chosen. Preferred substituted phenyls are sulphophenyls. Preferably, R is $C_1$–$C_9$ alkyl.

Though not preferred, it is also possible to use acylated citrates which are only partially esterified, i.e. R', R'' or R''' or combinations thereof are H, the only proviso being that not all three of R', R'' and R''' can be H in a given molecule. In the case where only one of R', R'' and R''' is H, i.e. the acylated citrate ester is a diester, it is preferred to have a "central" diester, i.e. it is preferred that R'' is not H. In the case where two of R', R'' and R''' are H, i.e. the acylated citrate ester is a monoester, it is preferred to have a symmetrical monoester, i.e. a central monoester, i.e. it is preferred that R'' is not H. In the case where monoesters are used, it is preferred that the ester chain be rather long, i.e. up to 18 carbon atoms.

Preferred acylated citrate esters are selected from the group consisting of acetyl triethyl citrate, octanoyl trimethyl citrate, acetyl trimethyl citrate, nonanoyl triethyl citrate, hexanoyl triethyl citrate, octanoyl triethyl citrate, nonanoyl trimethyl citrate, hexanoyl trimethyl citrate and mixtures thereof.

Some of the compounds according to the present invention are commercially available, such as acetyl triethyl citrate. Other compounds can be synthesized by methods which are well known from the person skilled in the art.

Bleach activators of interest in the present invention are disclosed in co-pending European patent application No. 91870207.7. Acylated citrate esters are also disclosed in the context of bar soaps in FR 2 362 210. They are chemically stable and can be efficient bleach activators.

Ethoxylated Alcohols

The compositions herein comprise from about 5 to about 25 wt %, preferably from about 10 to about 20 wt%, of two or more $C_{8-18}$, preferably $C_{9-15}$, alcohols which have been ethoxylated with an average of from about 2 to about 15, preferably 2–10, moles of ethylene oxide per mole of alcohol. The ethoxylated alcohols have a difference in Hydrophilic-Lipophilic Balances (HLBs) of at least 2, preferably 3. A mixture of the ethoxylated alcohols has a weighted average HLB equal to that of the acylated citrate ester, preferably between about 10 and about 12. A mixture or blend of two or more ethoxylated alcohols, with a weighted average HLB equal to that of the acylated citrate ester, is included herein in this definition.

In the compositions according to the present invention, the acylated citrate ester is emulsified in the composition by means of a mixture of the ethoxylated alcohols. The ester is stably emulsified in the composition. The emulsion is physically stable and the activator is kept separate from the hydrogen peroxide; thus, the composition is also chemically stable. The mixture of ethoxylated alcohols comprises a blend of ethoxylated alcohols.

The compositions preferably comprise from about 10 to about 20% of a first ethoxylated alcohol having a Hydrophilic-Lipophilic Balance of from about 1 to about 10, most preferably from about 5 to about 8, and a second ethoxylated alcohol having a Hydrophilic-Lipophilic Balance above 11, most preferably from about 11 to about 16.

A particularly suitable system comprises a first ethoxylated alcohol with an HLB of about 6, for instance a $C_{12-13}$ alcohol with an average of 2 moles of ethylene oxide per mole of alcohol, and a second ethoxylated alcohol with an HLB of about 15, such as a $C_{9-11}$ alcohol with an average of 10 moles of ethylene oxide per mole of alcohol.

The compositions according to the present invention may further comprise other ethoxylated alcohols/nonionic surfactants which should however not significantly alter the weighted average HLB value of the overall composition.

Preferably, the compositions according to the present invention are free of other surfactant types, especially anionic surfactants.

The compositions according to the present invention may further comprise the usual optional ingredients such as perfumes, dyes, optical brighteners, pigments, enzymes, soil release agents, dye transfer inhibitors, solvents, buffering agents and the like.

Amidoperoxyacid

The compositions of the present invention contain from about 1 to about 15, preferably from about 2 to about 10, most preferably from 3 to 6, weight % of bleach-compatible amidoperoxyacid, preferably solid, substantially water-insoluble organic amidoperoxyacids.

Suitable amidoperoxyacids for use herein are described in U.S. Pat. No. 4,634,551 and 4,686,063, both Burns et al, issued Jan. 6, 1987 and Aug. 11, 1987, respectively, both incorporated herein by reference. Suitable amidoperoxyacids are of the formula:

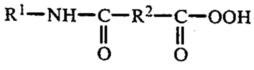 or 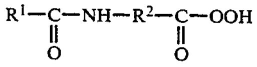

wherein $R^1$ is an alkyl group containing from about 6 to about 12 carbon atoms, and $R^2$ is an alkylene group containing from 1 to about 6 carbon atoms. Preferably, $R^1$ is an alkyl group containing from about 8 to about 10 carbon atoms, and $R^2$ is an alkylene group containing from about 2 to about 4 carbon atoms.

Also included are sulfone peroxyacids (sulfone peroxycarboxylic acids), which are described in U.S. Pat. Nos. 4,758,369, 4,824,591, and 5,004,558, all Dryoff et al, issued Jul. 19, 1988, Apr. 25, 1989, and Apr. 2, 1991, respectively, all incorporated herein by reference.

The most preferred amidoperoxyacids are monononylamido peroxyadipic acid (NAPAA) and monononylamido peroxysuccinic acid (NAPSA). Another name for NAPAA is 6-(nonylamino)-6-oxo-caproic acid. The chemical formula for NAPAA is:

The molecular weight of NAPAA is 287.4.

Example I of U.S. Pat. 4,686,063 contains one description of the synthesis of NAPSA, from column 8, line 40 to Column 9, line 5, and NAPAA, from column 9, line 15 to column 9, line 65. At the end of the amidoperoxyacid synthesis, the reaction is quenched with water, filtered, washed with water to remove some excess sulfuric acid (or other strong acid with which the peroxyacid was made), and filtered again.

The amidoperoxyacid wet cake thus obtained can be contacted with a phosphate buffer solution at a pH between about 3.5 and 6, preferably between about 4 and 5, according to U.S. Pat. No. 4,909,953, Sadlowski et al, issued Mar. 20, 1990, which is incorporated herein by reference.

Other agents for storage stabilization or exotherm control can be added to the amidoperoxyacid before incorporation into the final product. For example, boric acid, an exotherm control agent disclosed in U.S. Pat. No. 4,686,063, Burns, issued Aug. 11, 1987 and incorporated herein, can be mixed with the amidoperoxyacid (which has been washed in phosphate buffer) in about a 2:1 peracid:boric acid ratio. The phosphate buffer washed amidoperoxyacid can also be mixed with appropriate amounts of dipicolinic acid and tetrasodium pyrophosphate, a chelating stabilization system. Chelants can optionally be included in the phosphate buffer before contact with the wet cake.

NAPAA can be prepared by, for example, first reacting NAAA (monononyl amide of adipic acid), sulfuric acid, and hydrogen peroxide. The reaction product is quenched by addition to ice water followed by filtration, washing with distilled water, and final suction filtration to recover the wet cake. Washing can be continued until the pH of the filtrate is neutral.

Small particle size NAPAA agglomerates are desired herein for optimum stability and pourability, to increase the amount of effective bleach which is in the wash solution and thereby improve bleaching/cleaning of fabrics in the wash. This is particularly useful in a hard water wash, i.e. wash water with more than about 6 grains of hardness, because hardness, specifically calcium ions, has been seen to interfere with available oxygen (AvO) from NAPAA with larger particle size. While not meaning to be bound by theory, it is believed that the calcium ions in the hard water surround large NAPAA particles, i.e. greater than about 300 microns, and interfere with the dissolution of the NAPAA, and that the smaller (about 0.1-260 microns) NAPAA particles dissolve rapidly in the wash water with minimal interference from the hardness ions. Small NAPAA particles are preferably obtained by quenching in water with high shear applied, e.g. rapid stirring, during addition of the NAPAA solution to water. Other known means of achieving small particle size may be used as appropriate. The NAPAA is then rinsed with water to remove excess sulfuric acid.

The average particle size of the NAPAA (or NAPSA) herein is preferably 0.1 to 260 microns and is in large part a function of the amount of shear applied. The average particle size is preferably from about 10 to 100 microns, and most preferably from about 30 to about 60 microns.

NAPAA filter cake herein is preferably washed twice in phosphate buffer. It has been found that two successive phosphate buffer washes lend optimal stability to NAPAA.

NAPAA for use herein is preferably thermally annealed (or thermally agglomerated), meaning that it has been heated up to 70° C. and then quenched and filtered. This process causes NAPAA to grow into a new crystal morphology. These new NAPAA crystals are sheared to an average particle size of about 30-60 microns and are less readily soluble in the bleach product, thus resulting in a more stable product.

Process

The amidoperoxyacid, in a preferred embodiment, is emulsified together with the acylated citrate ester. In another embodiment, the amidoperoxyacid is mixed with the rest of the composition after the other required ingredients have been combined.

Included herein is a process for making a composition according to the above comprising the steps of:

a) dissolving said acylated citrate ester and said amidoperoxyacid into said first ethoxylated alcohol;
b) separately mixing said water, said hydrogen peroxide, and said second ethoxylated alcohol; and
c) emulsifying by pouring the product of step a) into the product of step b) while stirring.

Also included herein is a process for making a composition according to the above comprising the steps of:

a) mixing said acylated citrate ester and said first ethoxylated alcohol;
b) separately mixing the water, the hydrogen peroxide, and the second ethoxylated alcohol; and
c) combining said mixtures; and
d) mixing said amidoperoxyacid with the product of step c).

The following examples illustrate the compositions of the present invention. All parts, percentages and ratios used herein are by weight unless otherwise specified.

EXAMPLE I

A liquid cleaning and bleaching product is prepared with the following composition:

| Material | Weight % |
|---|---|
| $C_{12-13}$ alcohol ethoxylated with 2 moles of ethylene oxide per mole of alcohol | 8.4 |
| $C_{9-11}$ alcohol ethoxylated with 10 moles of ethylene oxide per mole of alcohol | 6.6 |
| Acetyl triethyl citrate | 7.0 |
| Hydrogen peroxide | 7.5 |
| Brightener | 0.12 |
| S,S-Ethylene diamino disuccinic acid | 0.1 |
| Perfume | 0.5 |
| Citric acid | to pH 4.0 |
| Water | Balance |

The ingredients listed above are added to a mixing tank with a single agitator in the order in which they appear below:

| Stock Material | Wt. % |
|---|---|
| Premix #1 | |
| $C_{9-11}$ alcohol ethoxylated with 10 moles of ethylene oxide per mole of alcohol | 7.74 |
| Water | 74.08 |
| Hydrogen peroxide (50%) | 17.87 |
| Brightener | 0.12 |
| S,S-Ethylene diamino disuccinic acid | 0.12 |
| Citric acid | 0.07 |
| Premix #2 | |
| $C_{12-13}$ alcohol ethoxylated with 2 moles of ethylene oxide per mole of alcohol | 51.52 |
| Acetyl triethyl citrate | 42.42 |
| Perfume | 2.03 |

Premix #2 is slowly added to premix #1 in a ratio of about 1:5.06 with vigorous stirring followed by prolonged, vigorous mixing for up to 5 hours. The resulting product has an initial pH of 3.15 and a viscosity of 648 centipoise (cps). The product is split into two equal portions, denoted below as A and B. To portion B, 5% active thermally annealed NAPAA is mixed in resulting in an increase of the initial viscosity to 792 cps. Both products remain physically and chemically stable for several days storage at room temperature:

| | Initial | | | 7-Days | | |
|---|---|---|---|---|---|---|
| | AvO | Viscosity | pH | AvO | Viscosity | pH |
| Product A | 3.409 | 648 | 3.15 | 3.298 | 403 | 2.83 |
| Product B | 3.533 | 792 | 3.20 | 3.365 | 413 | 3.02 |

EXAMPLE II

The performance of the products from Example I were evaluated in an experiment comparing the dingy cleanup and stain removal of a treatment containing a standard nil-P granular detergent plus a liquid bleach product (Product A above) with a treatment containing the same standard nil-P granular detergent plus the liquid bleach product plus NAPAA (Product B above).

To each of four top-loading automatic washing machines is added 5 lbs. of white ballast fabrics and 17 gallons of 95° F. soft water with hardness concentrate added to raise the hardness to 6 gr/gal. To one machine is added 66.3 gms. of detergent and 100 gms. of Product A. To the second machine is added 66.3 gms. detergent and 100 gms. of the NAPAA containing bleach product (Product B).

To each of the above wash solutions is added two sets of naturally soiled white fabrics and two sets of artificially stained swatches. The washing machines are then allowed to complete their normal washing and rinsing cycles, and the ballast and test fabrics are dryer dried. This procedure is repeated four times, using different sets of ballast fabrics, naturally soiled white fabrics, and artificially stained swatches for each replicate.

After completion of the four replicates, the fabrics and swatches are arranged under suitable lighting for comparison of dingy cleanup and stain removal. Three qualified graders compare the extent of dingy cleanup and removal of the stains using the following scale:

0: no difference between two swatches
1: thought to be a difference
2: certain of a difference
3: certain of a large difference
4: certain of a very large difference By this grading the naturally soiled white fabrics are compared for improvement in whiteness, and the artificially stained swatches are compared for removal of the stain. The grades obtained are then averaged to yield the results.

The NAPAA containing product showed significantly better removal of grass stains on polycotton (PC), gravy stains on cotton (C), and, particularly, tea stains on polycotton, and better whitening of dingy fabrics, than the non-NAPAA containing product:

| | Panel Score Unit Grades | | | |
|---|---|---|---|---|
| | A | | B | 95% LSD |
| Grass/PC | 0.32 | s | 1.79 | 0.81 |
| Gravy/C | 0.22 | s | 1.58 | 1.11 |
| Tea/C | 0.75 | s | 3.87 | 0.89 |
| T-shirts | −0.77 | s | 0.08 | 0.62 |
| Pillowcases | −0.03 | s | 0.97 | 0.63 |

s = statistically significant difference (confidence level of 95%)
Least Significant Difference (LSD)

EXAMPLE III

Compositions are made which comprise the listed ingredients in the listed proportions.

| Material | I | II | III | IV |
|---|---|---|---|---|
| $C_{12-13}$ alcohol ethoxylated with an average of 2 moles of ethylene oxide per mole of alcohol | 8.08 | 8.08 | 7.6 | 4.9 |
| $C_{9-11}$ alcohol ethoxylated with an average of 10 moles of ethylene oxide per mole of alcohol | 6.35 | 6.35 | — | — |
| $C_{12-13}$ alcohol ethoxylated with an average of 6.5 moles of ethylene oxide per mole of alcohol | — | — | 3.8 | 9.2 |
| Acetyl triethyl citrate | 6.73 | 6.73 | 6.6 | 6.6 |
| Hydrogen peroxide | 7.21 | 7.21 | 7.1 | 7.0 |
| Citric acid | 3.85 | 3.85 | 3.8 | 3.8 |
| S,S-Ethylene diamino disuccinic acid | 0.1 | — | — | — |
| Brightener 49 | 0.1 | 0.1 | — | — |
| Deionized water | | balance | | |
| NAPAA | 4 | 4 | 5 | 6 |

Compositions I to IV are each made by preparing two mixtures. A hydrophilic mixture is prepared which comprises the water, citric acid, brightener, S,S-EDDS and the $C_{9-11}$ alcohol ethoxylated with 10 moles of ethylene oxide per mole of alcohol or the $C_{12-13}$ alcohol ethoxylated with 6.5 moles of ethylene oxide per mole of alcohol. Hydrogen peroxide is added in said hydrophilic mixture as a last step.

A second, hydrophobic mixture is prepared which comprises the NAPAA, the acetyl triethyl citrate, and the $C_{12-13}$ alcohol ethoxylated with 2 moles of ethylene oxide per mole of alcohol.

Then the hydrophobic mixture is poured into the hydrophilic mixture, while mixing.

Compositions I to IV are stable emulsions, both from a chemical and a physical standpoint.

NAPSA can be substituted for NAPAA. Other ethoxylated alcohols can be substituted. Acetyl trimethyl citrate or nonanoyl triethyl citrate or nonanol trimethyl citrate or hexanoyl triethyl citrate or hexanoyl trimethyl citrate or octanoyl triethyl citrate or octanoyl trimethyl citrate can be substituted for the acetyl triethyl citrate.

What is claimed is:

1. A process for making a composition comprising, by weight of the composition:

(a) from about 1% to about 15% of amidoperoxyacid, said amidoperoxyacid being substantially water-insoluble at the pH of said composition;

(b) from about 0.5% to about 20% of hydrogen peroxide or a water-soluble source thereof;

(c) from about 10% to about 95% of water;

(d) from about 1% to about 15% of an acylated citrate ester; and (e) from about 5% to about 25% of a first and a second $C_{8-18}$ alcohol which have been ethoxylated with an average from about 2 to about 15 moles of ethylene oxide per mole of alcohol, wherein the ethoxylated alcohols have a difference in Hydrophilic-Lipophilic Balances of at least 2, and wherein a mixture of the ethoxylated alcohols has a weighted average Hydrophilic-Lipophilic Balance equal to that of said acylated citrate ester; and wherein the pH as is of said composition is from about 0.5 to about 6;

said process comprises the steps of:

i) dissolving said acylated citrate ester and said amidoperoxyacid into said first ethoxylated alcohol;

ii) separately mixing said water, said hydrogen peroxide or a water-soluble source thereof, and said second ethoxylated alcohol; and iii) emulsifying by pouring the product of step a) into the product of step b) while stirring.

2. A process for making a composition comprising, by weight of the composition:

(a) from about 1% to about 15% of amidoperoxyacid, said amidoperoxyacid being substantially water-insoluble at the pH of said composition;

(b) from about 0.5% to about 20% of hydrogen peroxide or a water-soluble source thereof;

(c) from about 10% to about 95% of water;

(d) from about 1% to about 15% of an acylated citrate ester; and (e) from about 5% to about 25% of a first and a second $C_{8-18}$ alcohol which have been ethoxylated with an average from about 2 to about 15 moles of ethylene oxide per mole of alcohol, wherein the ethoxylated alcohols have a difference in Hydrophilic-Lipophilic Balances of at least 2, and wherein a mixture of the ethoxylated alcohols has a weighted average Hydrophilic-Lipophilic Balance equal to that of said acylated citrate ester; and wherein the pH as is of said composition is from about 0.5 to about 6;

said process comprises the steps of:

i) mixing said acylated citrate ester and said first ethoxylated alcohol;

ii) separately mixing said water, said hydrogen peroxide or a water-soluble source thereof, and said second ethoxylated alcohol;

iii) combining said mixtures; and iv) mixing said amidoperoxyacid with the product of step c).

3. An aqueous cleaning and bleaching composition comprising, by weight of the composition:

(a) from about 1% to about 15% of amidoperoxyacid, said amidoperoxyacid being substantially water-insoluble at the pH of said composition;

(b) from about 0.5% to about 20% of hydrogen peroxide or a water-soluble source thereof;

(c) from about 1% to about 15% of an acylated citrate ester; and (d) from about 5% to about 25% of two $C_{8-18}$ alcohols which have been ethoxylated with an average from about 2 to about 15 moles of ethylene oxide per mole of alcohol, wherein the ethoxylated alcohols have a difference in Hydrophilic-Lipophilic Balances of at least 2, and wherein a mixture of the ethoxylated alcohols has a weighted average Hydrophilic-Lipophilic Balance equal to that of said acylated citrate ester;

wherein said acylated citrate ester is emulsified in said composition by said ethoxylated alcohols, and wherein the pH as is of said composition is from about 0.5 to about 6.

4. A composition according to claim 3 wherein said amidoperoxyacid is of the formula:

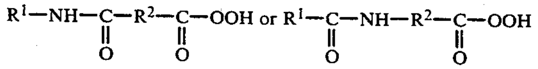

wherein $R^1$ is an alkyl group containing from about 6 to about 12 carbon atoms, and $R^2$ is an alkylene group containing from 1 to about 6 carbon atoms.

5. A composition according to claim 4 wherein $R^1$ is an alkyl group containing from about 8 to about 10 carbon atoms, and $R^2$ is an alkylene group containing from about 2 to about 4 carbon atoms.

6. A composition according to claim 4 wherein said acylated citrate ester is of the formula:

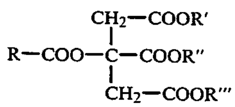

wherein R′, R″ and R‴ are independently selected from the group consisting of H, $C_{1-18}$ alkyl, $C_{1-18}$ alkenyl, substituted phenyl, unsubstituted phenyl, alkylphenyl, and alkenylphenyl, and R is selected from the group consisting of $C_{1-9}$ alkyl, $C_{1-9}$ alkenyl, substituted phenyl, unsubstituted phenyl, alkylphenyl, and alkenylphenyl.

7. A composition according to claim 6 wherein R is $C_1$–$C_9$ alkyl, and R′, R″ and R‴ are selected from the group consisting of H, $C_{1-4}$ alkyl and $C_{1-4}$ alkenyl, but R′, R″ and R‴are not all H.

8. A stable composition according to claim 3 which has a pH of from about 1 to about 5.

9. A stable composition according to claim 8 wherein said amidoperoxyacid is monononylamido peroxysuccinic acid or monononylamido peroxyadipic acid.

10. A stable composition according to claim 9 comprising from about 10 to about 20% of a first ethoxylated alcohol having a Hydrophilic-Lipophilic Balance of from about 5 to about 8, and a second ethoxylated alcohol having a Hydrophilic-Lipophilic Balance of from about 11 to about 16.

11. A stable composition according to claim 10 comprising from about 2 to about 10% of hydrogen peroxide.

12. A stable composition according to claim 11 wherein said acylated citrate ester is selected from the group consisting of acetyl triethyl citrate, octanoyl trimethyl citrate, acetyl trimethyl citrate, nonanoyl triethyl citrate, hexanoyl triethyl citrate, octanoyl triethyl citrate, nonanoyl trimethyl citrate, hexanoyl trimethyl citrate and mixtures thereof.

13. A stable composition according to claim 12 comprising from about 30 to about 90% of water.

14. A stable composition according to claim 13 comprising from about 2 to about 10% of acylated citrate ester.

15. A stable composition according to claim 14 which does not comprise anionic surfactant.

* * * * *